United States Patent [19]

Toyama et al.

[11] Patent Number: 4,908,547
[45] Date of Patent: Mar. 13, 1990

[54] BEAM INDEX TYPE COLOR CATHODE RAY TUBE

[75] Inventors: Takashi Toyama, Tokyo; Minoru Ohzeki, Kanagawa; Takahiro Yukawa, Tokyo, all of Japan

[73] Assignee: Sony Corporation, Tokyo, Japan

[21] Appl. No.: 770,880

[22] Filed: Aug. 29, 1985

[30] Foreign Application Priority Data

Sep. 4, 1984 [JP] Japan ................... 59-184859

[51] Int. Cl.$^4$ ............................................. H01J 29/30
[52] U.S. Cl. .................................................... 313/471
[58] Field of Search ............... 313/471, 461, 466, 467, 313/470

[56] References Cited

U.S. PATENT DOCUMENTS 4,193,015  3/1980  Barten ............................ 313/470 X
4,406,974  9/1983  Tanaka et al. ................... 313/471 X Primary Examiner—Sandra O'shea
Attorney, Agent, or Firm—Lewis H. Eslinger; Jay H. Maioli

[57] ABSTRACT

Described is a beam index type color cathode ray tube in which at least one of tricolor phosphor stripes, that is the red, blue and green stripes, is different in width from the other color phosphor stripes, and m index stripes are associated with n sets or triplets of the color phosphor stripes. The widthwise center-to-center distance between the adjoining color phosphor stripes is set to a constant value. Each index stripe is of a width lesser than the width of the guard band provided between adjoining ones of the color phosphor stripes, and is provided at the widthwise center of the associated guard band. The arrangement provides index signals of sufficient intensity, while assuring a positive color switching.

4 Claims, 3 Drawing Sheets

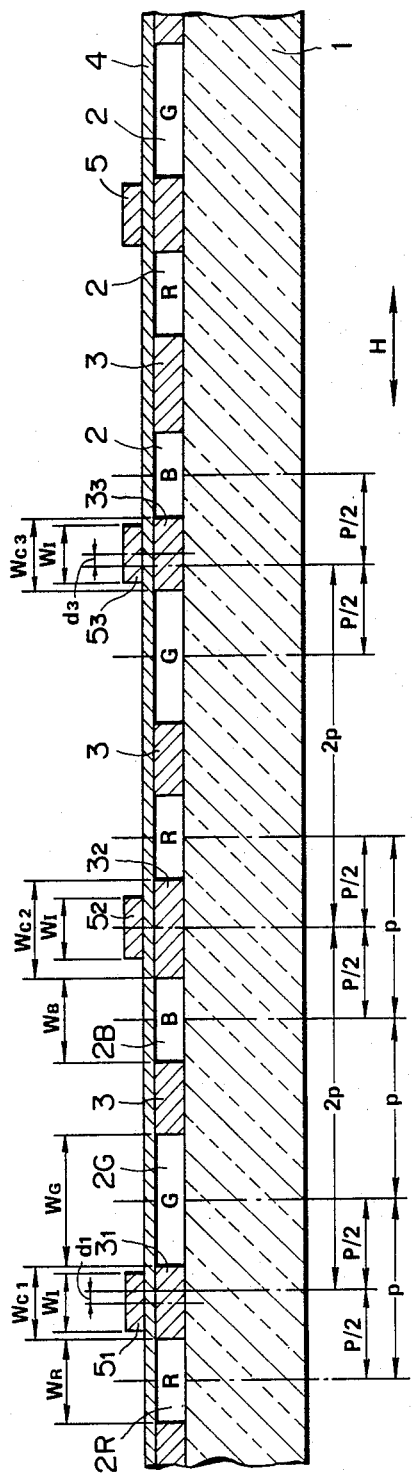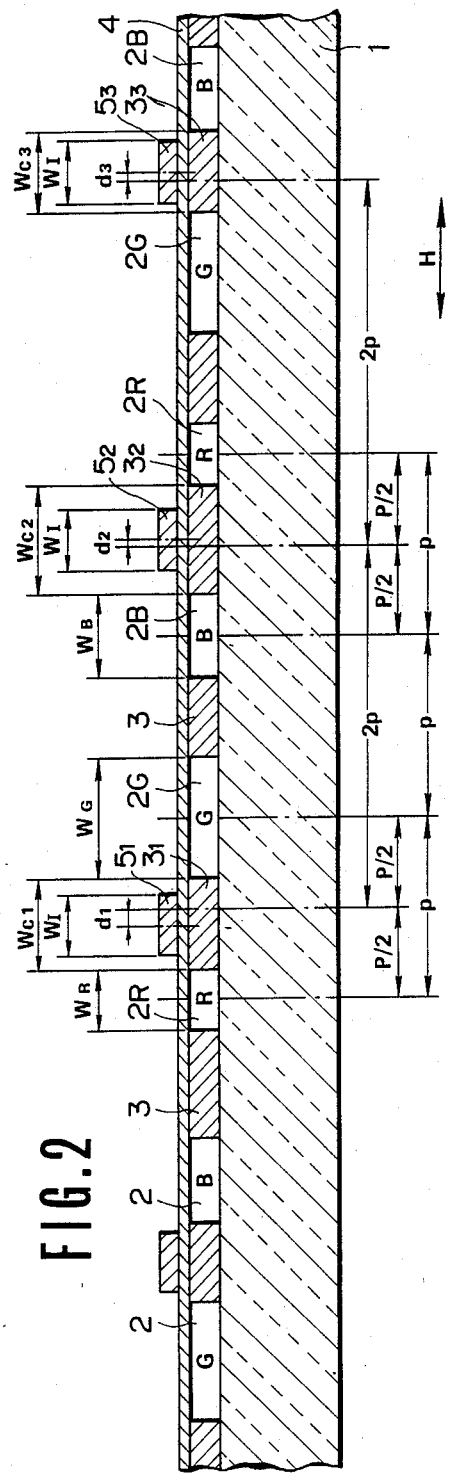

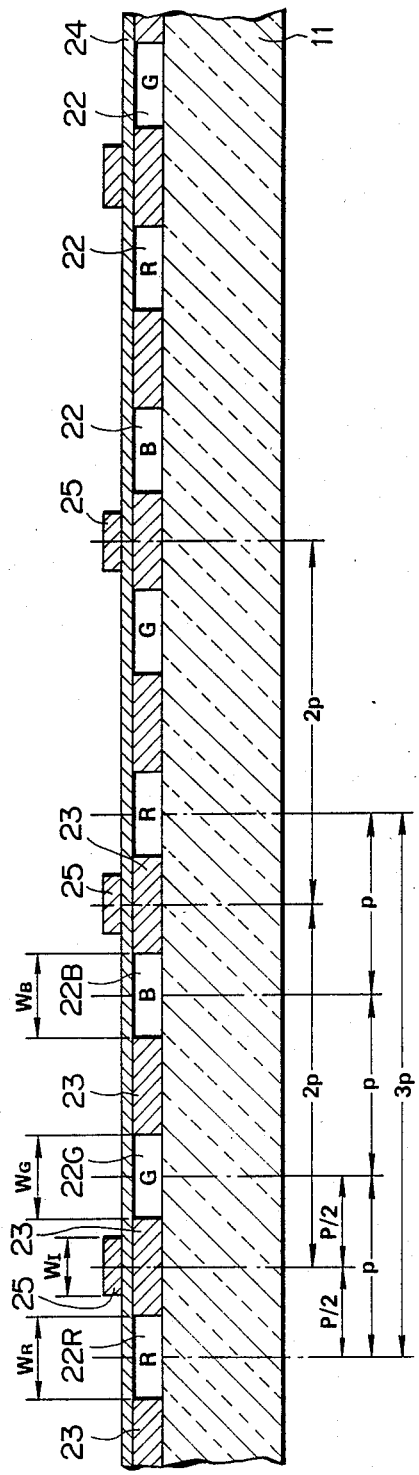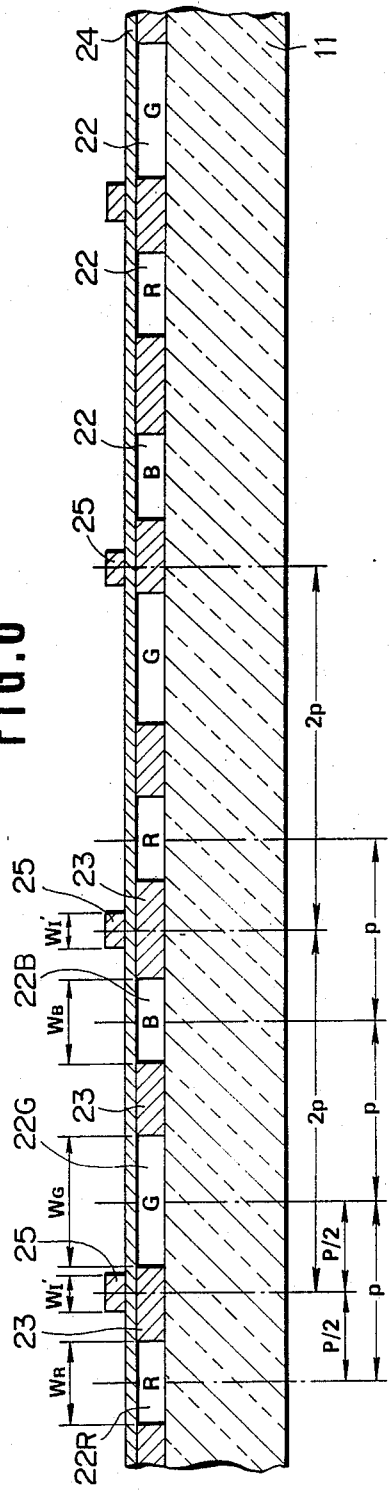

BEAM INDEX TYPE COLOR CATHODE RAY TUBE

FIELD OF THE INVENTION

This invention relates to a beam index type color cathode ray tube and, more particularly, to such tube wherein at least one of the red, blue and green phosphor stripes is different in width from the remaining color phosphor stripes.

BACKGROUND OF THE INVENTION

The prior-art example of the beam index color cathode ray tube is shown in FIG. 3. In this figure, the cathode ray tube is comprised of a screen panel 11 in the form of a flat plate, a funnel part 12 and an electron gun 13. On the inner surface of the screen panel 11 there are coated a large number of parallel vertically extending color phosphor stripes 22. These stripes 22 are in the form of triplets of red, green and blue phosphor stripes and arranged in the order of red phosphor stripes 22R, green phosphor stripes 22G and blue phosphor stripes 22B cyclically as indicated by the arrow mark H. A large number of guard bands 23 of, for example, carbon black, are provided between adjoining ones of these color phosphor stripes. A metal back 24 formed of a layer of electrically conductive metal such as aluminium is applied on the overall surfaces of the color phosphor stripes 22 and the guard bands. On the metal back 24, there are applied a plurality of index signal detecting phosphor stripes or so-called index stripes 25 at positions corresponding to preset ones of the guard bands 23. On a portion of, for example, the funnel part 12, there are provided a plurality of photo-sensors or light receiving elements 14 for sensing the light beam or electro magnetic waves emitted upon impingement of the electron beam on these index stripes 25.

In the color cathode ray tube showing in FIG. 3, the electron beam 15 emitted from the electron gun 13 impinges on the tricolor phosphor stripes 22R, 22G, 22B for exciting and emitting the light from these stripes. It also impinges on the index stripes 25 for exciting and emitting the index light (or electro-magnetic waves) 16 from these stripes. The light 16 is sensed by the photo-sensors 14 for deriving the index signals. The switching signals for switching the respective prime color signals (red, green and blue signals) of the video color signal or so-called color switching signals, are evolved on the basis of these index signals.

It will be noted that, in the instances wherein the color switching signals are evolved on the basis of these index signals, the relation of a so-called non-integral system is preferably, maintained between the frequency $f_I$ of the index signals and the frequency $f_S$ of the color switching signals such that $$f_I = \frac{m}{n} f_S$$

Wherein m and n are natural numbers that are relatively prime. It is because the color signals are adversely affected by the index signals in the integral system, that is, the system wherein the frequency $f_I$ is equal to some whole or integral number multiple of the frequency $f_S$. The relative disposition between the color phosphor stripes 22R, 22G and 22B and the index stripes 25 for the typical case of the nonintegral system wherein m=3 and n=2, is shown in FIG. 4.

In this figure, three index stripes 25 are associated with two triplets on sets of red (R), green (G) and blue (B) color phosphor stripes 22R, 22G and 22B. The widthwise distance between the centers of any adjoining pair of the adjoining color phosphor stripes 22 or the pitch of the color phosphor stripes 22 is constant, whereas the widths $W_R$, $W_G$ and $W_B$ of the respective color phosphor stripes 22R, 22G and 22B are also equal to one another ($W_R = W_G = W_B$). Hence, the widths of the guard bands 23 are also constant and equal to one another. The index stripes 25 of the constant width $W_I$ are centered on these guard bands 23 so as to satisfy the non-integral relation, that is, at the rate of three index stripes to two triplets described above. These index stripes 25 are arranged with the phase difference of p/2 with respect to the constant-pitch color phosphor stripes 22, and are arranged at a constant pitch equal to 2p.

FIG. 5 shows in a block circuit diagram a beam index type color CRT having a screen panel as described in connection with FIG. 4, and the related circuit. Referring to FIG. 5, the index signals from the photosensor 14 of the beam index color cathode ray tube 10 with the frequency $f_I$ equal to, for example, 8.4MHz, are supplied to a limiter 32 through as band pass filter (BPF) 31 which has the same frequency $f_I$ as the central transmission frequency. The index signals are limited at a preset level by the limiter 32 and thereby converted into nearly rectangular signals which are supplied to a PLL circuit 33. The circuit 33 has a phase comparator 34, a low pass filter (LPF) 35 and a voltage controlled oscillator (VCO) 36 in this order as viewed from the input side. The VCO 36 is set for being oscillated at a frequency $2f_I$ at e.g. 16.8 MHz) which is double the frequency $f_I$. The output signals from the VCO 36 are frequency divided by a ½ frequency divider 37 and supplied to a phase comparator 34 for phase comparison with the index signals from the limiter 32. Thus the signals from the VCO 36 of the PLL circuit 33 are phase-matched with the index signals while the frequency thereof is increased to twice index signal frequency, that is, to a value $2f_I$ equal to, for example, 16.8 MHz. These VCO signals with the frequency equal to $2f_I$ are supplied to a ⅓ frequency divider 39.

In the ⅓ frequency divider 39, the output signal frequency $2f_I$ from the PLL circuit 33 is divided by 3 while the signal is formed into three color switching signals phase-shifted relative to each other by 120° and having the frequency $f_S (=2f_I/3)$ equal to, for example, 5.6 MHz. These three signals are then supplied to a color switching circuit 40. To this circuit 40 are also supplied three prime color video signals, that is, red (R) signals $S_R$, green (G) signals $S_G$ and blue (B) signals $S_B$, via input terminals 41R, 41G and 41B, respectively. These color signals $S_R$, $S_G$ and $S_B$ are added to one another and mixed with the aid of switches 42R, 42G and 42B of the color switching circuit 40 and thence supplied to a video output circuit 43. These switches 42R, 42G and 42B in the color switching circuit 40 are turned on and off by the three switching pulse signals having a phase shift of 120° from one another. Hence, the respective color signals R, G, B are alternately outputted switching circuit 40 with the phase shift of 120° to each other and within the period $T_S$ equal to $1/f_S$ or $3/2f_I$ which is 3/2 times the index signal period $T_I$ equal to $1/f_I$, these color signals being then supplied to the electron gun 13 of the cathode ray tube 10.

In this manner, two-period color switching signals are outputted each time three index stripes 25 (FIG. 4) are sensed. The color signals $S_R$, $S_G$ and $S_B$ are sequentially switched in dependence upon these color switching signals such that the electron beam 15 sequentially irradiated on the color phosphor stripes 22R, 22G and 22B are modulated in brightness with the corresponding timing by the respective color signals $S_R$, $S_G$ and $S_B$, thus providing for color image reproduction.

It will be noted that, with the above described beam index color cathode ray tube, the respective widths $W_R$, $W_G$ and $W_B$ of the red, green and blue color phosphor stripes 22R, 22G and 22B need to be different from one another for realizing so-called white balance in consideration of the difference in the light emitting characteristics of the respective phosphorescent materials. FIG. 6 shows a case wherein, for an example, only the width $W_G$ of the green (G) phosphor stripes 22G is different from the widths $W_R$, $W_B$ of the other color phosphor stripes 22R, 22B ($W_G > W_R = W_B$). In a projector tube, above all, wherein a high brightness light emission is required and the respective color phosphor materials need to be excited with the large current density electron beam, it is necessary that, for maintenance of the white balance, only the width $W_G$ of the green phosphor stripes $22_G$ be larger than the other widths $W_R$, $W_G$, especially in consideration that the green phosphor materials having light emitting characteristics comparable to those of the other color phosphor materials are presently not evolved.

Since the center-to-center distance between adjoining ones of the respective color phosphor stripes 22R, 22G, 22B or the pitch p in FIG. 6 is same and constant, the width $W_I'$ of the index stripe 25 needs to be reduced if the index stripes 25 that will satisfy the requirement of the above described non-integral system concerning the number of the index stripes and that of triplets should be arranged at the central positions between adjoining ones of the color phosphor stripes 22 with a phase difference equal to p/2. Hence the index light or electromagnetic waves resulting from impingement of the electron beam on the index stripes 25 is lowered in intensity with the result that it is occasionally infeasible to obtain normal color switching signals.

It is seen from above that, in instances wherein the widths of the respective color phosphor stripes of the beam index type color cathode ray tube are not equal to one another and the index stripes that will satisfy the above described non-integral system requirements are to be arranged with an equal pitch as described above, there results a limited allowance of the index stripe width relative to the color phosphor stripe width and hence the necessarily reduced index stripe width with reduction in the index signal intensity thus interfering with normal color switching.

OBJECTS AND SUMMARY OF THE INVENTION

It is therefore a principal object of the present invention to overcome the above problems and to provide a beam index type color cathode ray tube according to which, even in instances wherein the widths of the red, green and blue phosphor stripes are not equal to one another, the index stripes of a larger width can be provided for satisfying the aforementioned non-integral requirements for providing index signals of a sufficient intensity and assuring a positive color switching.

The present invention resides in the beam index type color cathode ray tube wherein a large number of red, green and blue phosphor stripes are arranged cyclically on the screen surface of the cathode ray tube in parallel with one another, and wherein m index stripes associated with n sets of three color phosphor stripes are arranged over guard bands provided between adjoining ones of said color phosphor stripes, n and m being natural numbers that are relatively prime, characterized in that the widthwise center-to center distances between the adjoining color stripes are equal to one another, in that the width of at least one of the red, green and blue stripes is different from the widths of the other color phosphor stripes, in that the respective index stripes are of a constant width not larger than the minimum width of the guard band, and in that the index stripes are arranged with the widthwise centers thereof coincident with those of the associated guard bands.

With the beam index type color cathode ray tube, the width of the index stripe can be set so as to be larger within the range lesser than the minimum one of the guard band widths, with the result that the index signals are prevented from going to a lower level. In addition, any deviation from the equal pitch disposition of the index stripes can be cancelled within the framework of a present number of index stripes for avoiding any adverse effect on the PLL circuit and providing normal color switching signals, while the conditions for the aforementioned conditions for the non-integral system are satisfied.

Other objects, features and advantages of the present invention will be apparent from the following description of embodiments especially when read in conjunction with the accompanying drawings.

BRIEF DESCRIPTION OF THE DRAWINGS

FIG. 1 is a schematic sectional view showing essential parts of screen panel according to a first embodiment of the present invention.

FIG. 2 is a schematic sectional view showing according to a second embodiment of the present invention.

FIG. 4 is a schematic sectional view showing a screen panel according to a prior-art example.

FIG. 6 is a schematic sectional view showing conventional screen panel.

DETAILED DESCRIPTION OF THE PREFERRED EMBODIMENTS

Figure 3:
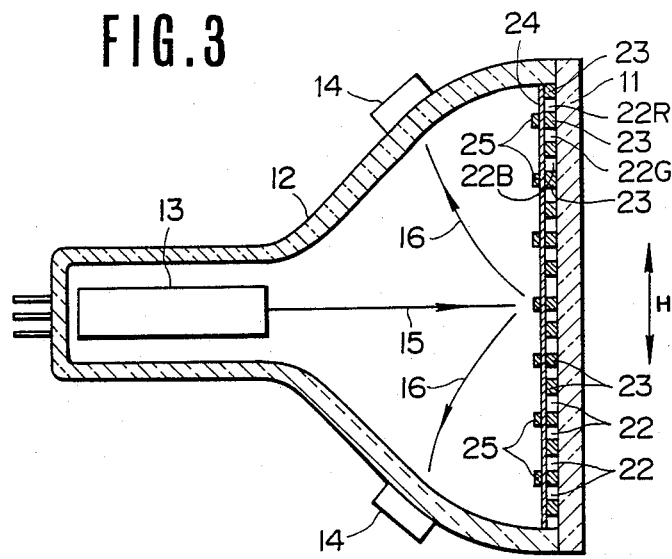
FIG. 3 is a schematic sectional view of a beam index type color cathode ray tube.

Referring to FIG. 1, there are illustrated only essential part of the screen panel according to a first embodiment of the present invention. Referring to this figure, a large number of vertically extending parallel color phosphor stripes 2 are arranged on a display surface of a beam index type color cathode ray tube, that is, on a screen panel 1, with a constant pitch p, that is, so that the widthwise center-to-center intervals between the adjoining stripes are constant and equal to each other. These color phosphor stripes are comprised of red (R) phosphor stripes 2R, green (G) phosphor stripes 2G and blue (B) phosphor stripes 2B that are applied cyclically in the order of R-G-B, with only the width $W_G$ of each phosphor stripe 2G being larger than the widths $W_R$, $W_B$ of the remaining color phosphor stripes 2R, 2B ($W_G > W_R = W_B$). Between adjoining ones of the respective color phosphor stripes 2 are coated guard bonds 3 formed of carbon black, as an example. A metal back 4 consisting of an electrically conductive metal film, such as Al film, is coated on the overall surfaces of the color phosphor stripes 2 and the guard bands 3. On the metal back 4 are coated index signal detection phosphor stripes, or socalled index stripes 5.

These index stripes are arranged on every other one of the guard bands 3. This indicates the special case of the above describes non-integral system requirements wherein m=3 and n=2. When n sets or triplets of the three color phosphor stripes R,G,B are provided to m index stripes, wherein n and m are natural numbers that are reratively prime, m index stripes are allotted to 3n guard bands. With m=3 and n=2, three index stripes 5 are allotted to six guard bands 3. FIG. 1 shows an example wherein index stripes 5 are arranged for every other one of the guard bands 3, that is, with the period of two guard bands 3. Alternatively, two index stripes may be provided consecutively to four consecutive guard bands, that is two index stripes may be provided on adjacent two guard bands while no index stripes are not provided on the next adjacent two guard bands, with cyclic repetition of the pattern of the index stripes and the guard bands.

In addition, the index stripes 5 shown in FIG. 1 are of a width not in excess of the minimum value of the width of the guard band 3, and are arranged in such a manner that the widthwise center of each index stripe 5 is coincident with the widthwise center of the associated guard band 3.

In the above described disposition of the phosphor stripes and the guard bands, the respective color phosphor stripes 2 are arranged with an equal pitch p and only the width $W_G$ of the green phosphor stripes 2G is set so as to be larger than the widths $W_R$, $W_B$ of the remaining color phosphor stripes. Therefore, the following relationship $$W_{C2} > W_{C1} > W_{C3}$$

holds among the width $W_{C1}$ of the guard band 31 between the red (R) phosphor stripe 2R and the green (G) phosphor stripe 2G, the width $W_{C2}$ of the guard band $3_2$ between the blue (B) phosphor stripe 2B and red (R) phosphor stripe 2R and the width $W_{C3}$ of the guard band $3_3$ between the green (G) phosphor stripe 2B and the blue (B) phosphor stripe (B). Hence, by setting the width $W_I$ of the index stripes 5 so as to be about equal to but not to be in excess of the widths $W_{C1}$, $W_{C3}$, the respective index stripes 5 can be arranged on the guard bands 3 without extending beyond the guard bands 3 in the widthwise direction.

It will be noted that the distance or interval between the neighboring index stripes 5 in the horizontal scanning direction, that is, the direction shown by the arrow mark H in FIG. 1 is not constant as at $2_p$ as in the above described prior-art system, but some index stripes 5 are shifted from the standard pitch position. By the standard pitch position is assumed herein a disposition in which the index stripe has a phase difference equal to p/2 with respect to the equal pitch disposition of the respective index stripes 5 and the center-to-center distance between the adjoining index stripes or pitch is constant and equal to $2_p$. It is seen that, with respect to the above defined standard pitch position, the position of the index stripe $5_1$ between the red (R) phosphor stripe 2R and the green (G) phosphor stripe 2G is shifted $d_1$ in the direction of the red (R) phosphor stripe 2R (or towards left in FIG. 1), while the position of the index stripe $5_3$ between the green (G) phosphor strip 2G and the blue (B) phosphor stripe 2B is shifted $d_3$ in the direction of the blue (B) phosphor stripe 2B (or towards right in FIG. 1). On the other hand, the index stripe $5_2$ between the blue (B) phosphor stripe 2B and the red (R) phosphor stripe 2R is at the above defined standard pitch position.

It will be also be noted that, since the shift $d_1$ of the index stripe $5_1$ and the shift $d_3$ of the index stripe $5_3$ are equal in magnitude and opposite in sense, these shifts $d_1$, $d_3$ are cancelled within the framework or extent of the two triplets of red (R), green(G) and blue (B) phosphors stripes, so that their effect on the index signal sensing circuit system (shown in FIG. 5) is almost negligible.

Figure 5:
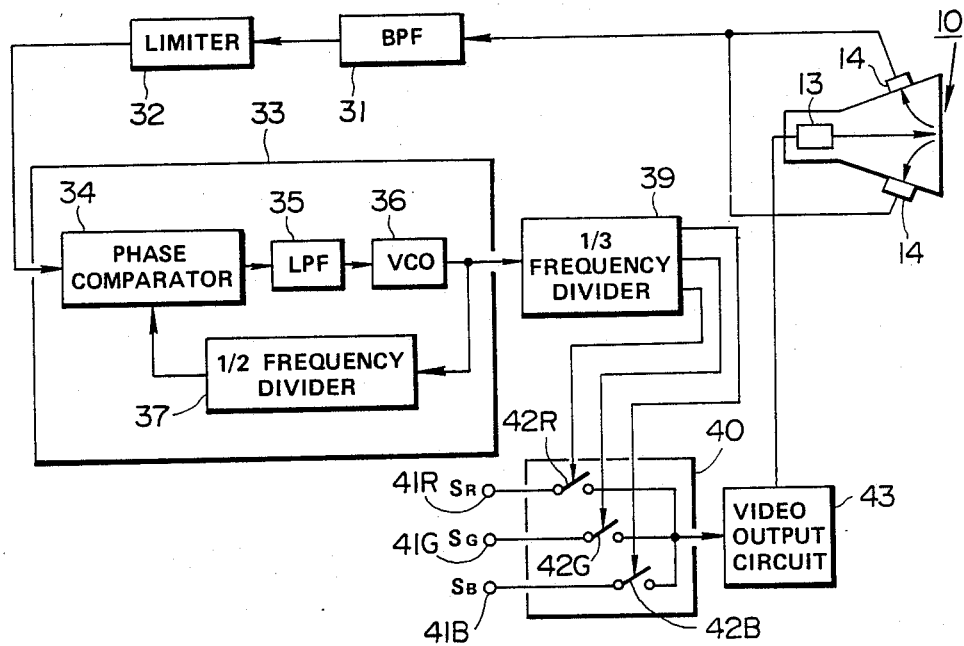
FIG. 5 is a block circuit diagram showing a typical circuit for providing color switching signals.

That is, the PLL circuit 33 shown for example in FIG. 5 operates responsive to the phase shift in the input signals to maintain a constant phase relation of the output signals with respect to the input signals. However, the response time constant of the PLL circuit is different from the input signal period by one or more digits so that the circuit operation is not substantially affected by the phase shift of the order of several periods of the input signals. With the index signals obtained with the index stripes 5 shown in FIG. 1, only small phase shifts are caused in the first and third periods of the three-period signals, these shifts cancelling each other. Thus, on averaging the three consecutive signal periods, no phase shift presents itself, no phase shift being caused in the index signals when seen in their entirety. In this manner, the aforementioned normal color switching signals can be obtained on the basis of the index signals derived from the index stripes of FIG. 1. It will be noted that, since the width $W_I$ of the index stripe 5 can be selected in a wide range which does not exceed the smallest one of the widths $W_{C1}$, $W_{C2}$ and $W_{C3}$ of the guard bands 3, there is no risk that the index signal intensity be lowered.

It is to be noted that the screen panel having the construction as shown in FIG. 1 can be used for the preparation of the beam index type color cathode ray tube shown in FIG. 3.

FIG. 2 shows a second embodiment of the present invention, wherein the widths $W_R$, $W_G$ and $W_B$ of the respective color phosphor stripes 2R, 2G and 2B are different from one another so that, as an example, $W_G > W_B > W_R$. In this case, the following relation $$W_{C2} > W_{C1} > W_{C3}$$

holds among the width $W_{C1}$ of the guard band $3_1$ between the red (R) phosphor stripe 2R and the green (G) phosphor stripe 2G, the width $W_{C2}$ of the guard band $3_2$ between the blue (B) phosphor stripe 2B and the red (R) phosphor stripe 2R and the width $W_{C3}$ of the guard band $3_3$ between the green (G) phosphor stripe 2G and the blue (B) phosphor stripe 2B. With respect to the shift of the respective index stripes 5 from the above described standard pitch position, the index stripe $5_1$ on the guard band $3_1$ is shifted $d_1$ towards left in FIG. 2, the index stripe $5_1$ on the guard band $3_2$ in shifted $d_2$ towards right in FIG. 2, while the index stripe $5_3$ is shifted $d_3$ towards right in FIG. 2.

The arrangement of FIG. 2 is otherwise similar to that shown in FIG. 1 so that the parts corresponding to those shown in FIG. 1 are indicated by the some reference numerals and the corresponding description is omitted for simplicity. It is to be noted that the width $W_1$ of the index stripe 5 may selected to be as large as possible insofar as it does not exceed the minimum guard band width $W_{C3}$.

In the second embodiment shown in FIG. 2, the shift $d_1$ of the index stripe $5_1$ is equal in magnitude to the sum of the shifts $(d_2+d_3)$ of the index stripes $5_2$, $5_3$ $(d_1=d_2+d_3)$ but opposite in phase thereto so that the phase shift is reduced to nil on averaging over the respective three index signal periods of the three index stripes $5_1$, $5_2$, $5_3$. Thus the normal color switching signals can be provided without affecting the operation of the PLL circuit, similarly to the above described first embodiment.

From the foregoing it is seen that the index type color cathode ray tube may be provided in which, even when at least one of the color phosphor stripes is of different width from the widths of the remaining color stripes, the index stripes can be designed with a larger width while the requirements for the non-integral system are satisfied. In this manner, index signals of the higher signal level can be obtained, while the normal color switching signals can be evolved without affecting the PLL circuit or the related circuits.

It is to be noted that the present invention is not limited to the above described embodiments. For example, the numbers m, in the above described non-integral system are not limited to 3 and 2, respectively, but may be set to any set of natural numbers that are relatively prime. Various other changes can be made without departing from the scope of the invention.

What is claimed is:

1. A beam index type color cathode ray tube including a screen having a screen surface adapted to be scanned by a single electron beam making successive sweeps in a widthwise direction of said screen surface to generate successive horizontal lines of an image, comprising:

a large number of red, green and blue phosphor stripes having widths $W_R$, $W_G$ and $W_B$, respectively, arranged cyclically in said widthwise direction on the screen surface of the cathode ray tube and extending in parallel with one another perpendicular to said widthwise direction and in sets of three phosphor stripes including one of each color, adjoining ones of said stripes being separated in said widthwise direction by a parallel guard band, each guard band having a width at least as large as a minimum width;

m index stripes associated with n of said sets of three color phosphor stripes being arranged over respective ones of said guard bands, n and m being natural numbers that are relatively prime;

widthwise center-to-center distances between the adjoining color phosphor stripes being equal to one another;

the width of at least one of the red, green and blue phosphor stripes being different from the widths of the other color phosphor stripes;

the index stripes being of a constant width approximately as large as the minimum width of the guard bands; and the index stripes being arranged with widthwise centers thereof coincident with widthwise centers of the respective guard bands, said index stripes being irregularly spaced in said widthwise direction in a pattern repeating every $m$ index stripes.

2. The beam index type color cathode ray tube according to claim 1, characterized in that m and n are equal to 3 and 2, respectively.

3. The beam index type color cathode ray tube according to claim 1, characterized in that the width $W_G$ of each said green phosphor stripe is larger than the widths of the remaining ones of the phosphor stripes.

4. The beam index type color cathode ray tube according to claim 1, characterized in that the widths $W_G$, $W_B$ and $W_R$ of the green, blue and red phosphor stripes are selected to satisfy the relation $W_G > W_B > W_R$.

* * * * *